(12) United States Patent
Furrer et al.

(10) Patent No.: US 7,684,816 B2
(45) Date of Patent: Mar. 23, 2010

(54) METHOD AND APPARATUS TO FACILITATE COMMUNICATION RESOURCE ALLOCATION FOR SUPERGROUPS

(75) Inventors: Nathaniel M. Furrer, Schaumburg, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 964 days.

(21) Appl. No.: 11/399,668

(22) Filed: Apr. 6, 2006

(65) Prior Publication Data
US 2007/0238477 A1 Oct. 11, 2007

(51) Int. Cl.
H04Q 7/20 (2006.01)
H04B 7/00 (2006.01)
H04M 3/42 (2006.01)

(52) U.S. Cl. .................. 455/518; 455/519; 455/517; 455/416

(58) Field of Classification Search .......... 455/517, 455/518, 519, 531, 426.1, 564, 416, 450
See application file for complete search history.

(56) References Cited

U.S. PATENT DOCUMENTS

| 6,308 | A | * | 4/1849 | Parry ........................... 209/452 |
| 5,423,061 | A | * | 6/1995 | Fumarolo et al. ............ 455/519 |
| 5,790,527 | A | * | 8/1998 | Janky et al. ................... 370/330 |
| 5,850,611 | A | * | 12/1998 | Krebs ........................... 455/518 |
| 5,933,780 | A | * | 8/1999 | Connor et al. ............... 455/519 |
| 5,960,362 | A | * | 9/1999 | Grob et al. .................. 455/527 |
| 6,163,697 | A | | 12/2000 | Peterson |
| 6,385,458 | B1 | * | 5/2002 | Papadimitriou et al. .. 455/456.2 |
| 6,944,137 | B1 | * | 9/2005 | Pan et al. ..................... 370/266 |
| 7,483,407 | B2 | * | 1/2009 | McDonald et al. .......... 370/330 |
| 7,499,707 | B2 | * | 3/2009 | Fenton et al. ............. 455/452.2 |
| 2005/0259623 | A1 | | 11/2005 | Garudadri |

FOREIGN PATENT DOCUMENTS

GB 2336070 A 10/1999

* cited by examiner

Primary Examiner—Tilahun Gesesse
(74) Attorney, Agent, or Firm—Indira Saladi; Anthony P. Curtis

(57) ABSTRACT

A network element (300) can facilitate allocating first and second communication resources (such as, but not limited to, FDMA and TDMA communication resources) in support of supergroup communications. By one approach this comprises identifying (101) communication talkgroups as are to comprise a part of the communication supergroup and then determining (102) whether any of the communication talkgroups comprise first resource-only talkgroups. When any one of the communication talkgroups comprises a first resource-only talkgroup, the network element allocates (103) communication resources to support the communication supergroup wherein the communication resources do not comprise second resource communication resources (for example, the network element allocates first resource communication resources). On the other hand, when none of the communication talkgroups comprises a first resource-only talkgroup, the network element allocates (104) communication resources to support the communication supergroup wherein the communication resources comprise second resource communication resources.

20 Claims, 2 Drawing Sheets

METHOD AND APPARATUS TO FACILITATE COMMUNICATION RESOURCE ALLOCATION FOR SUPERGROUPS

TECHNICAL FIELD

This invention relates generally to communication talkgroups and more particularly to communication supergroups.

BACKGROUND

Communication talkgroups are known in the art. A talkgroup typically comprises a plurality of end users (and/or end user platforms) that are associated in a common group. Communications amongst and/or to a talkgroup are then readily facilitated by simply addressing or targeting a communication to, for example, an identifier for the talkgroup rather than for each individual member of that talkgroup. Such a technique has particular applicability in push-to-talk communications where, by simply pushing a transmit button a given end user can simultaneously address every member of the talkgroup. Talkgroups also permit a group of communication platforms to share network communication resources and hence can often result in considerable network efficiencies.

Communication supergroups are also known in the art. A supergroup simply comprises an aggregation of a plurality of talkgroups (usually on a temporary basis) into a so-called supergroup. To illustrate, a supergroup might be temporarily formed to permit a first talkgroup comprising police officers in vehicles, a second talkgroup comprising a strategic weapons and tactics group, and a third talkgroup comprising local fire fighters to readily communicate amongst themselves to meet some present emergency situation. Because of the relatively dynamic nature of such a setting, it is not unusual for additional talkgroups to be added to an existing supergroup and/or for existing supergroup talkgroups to be excised from the supergroup on the fly.

Talkgroups and supergroups are supported by a variety of communications systems that use a variety of enabling and/or bearer technologies. For example, frequency division multiple access (FDMA) and time division multiple access (TDMA) systems and/or end user platforms often represent a given legacy condition. In some instances a given network, or some portion of a given network, may only be able to support, for example, FDMA communication resources while other networks (or other parts of a given network) may be able to support either TDMA or FDMA communication resources. By the same token, some end user platforms may comprise FDMA-only platforms while other end user platforms may be capable of TDMA or FDMA communication resource usage. As another example, some talkgroups may be limited to usage of an FDMA-tied technology such as a full-rate vocoder while other talkgroups may be capable of using a TDMA-related technology such as a half-rate vocoder.

The existence of such conditions, of course, can greatly complicate supporting supergroup formation and facilitation. Significant network resources can be quickly allocated and consumed when attempting to facilitate supergroup communications when disparate conditions such as those mentioned above are applicable.

BRIEF DESCRIPTION OF THE DRAWINGS

The above needs are at least partially met through provision of the method and apparatus to facilitate communication resource allocation for supergroups described in the following detailed description, particularly when studied in conjunction with the drawings, wherein.

Figure 1:
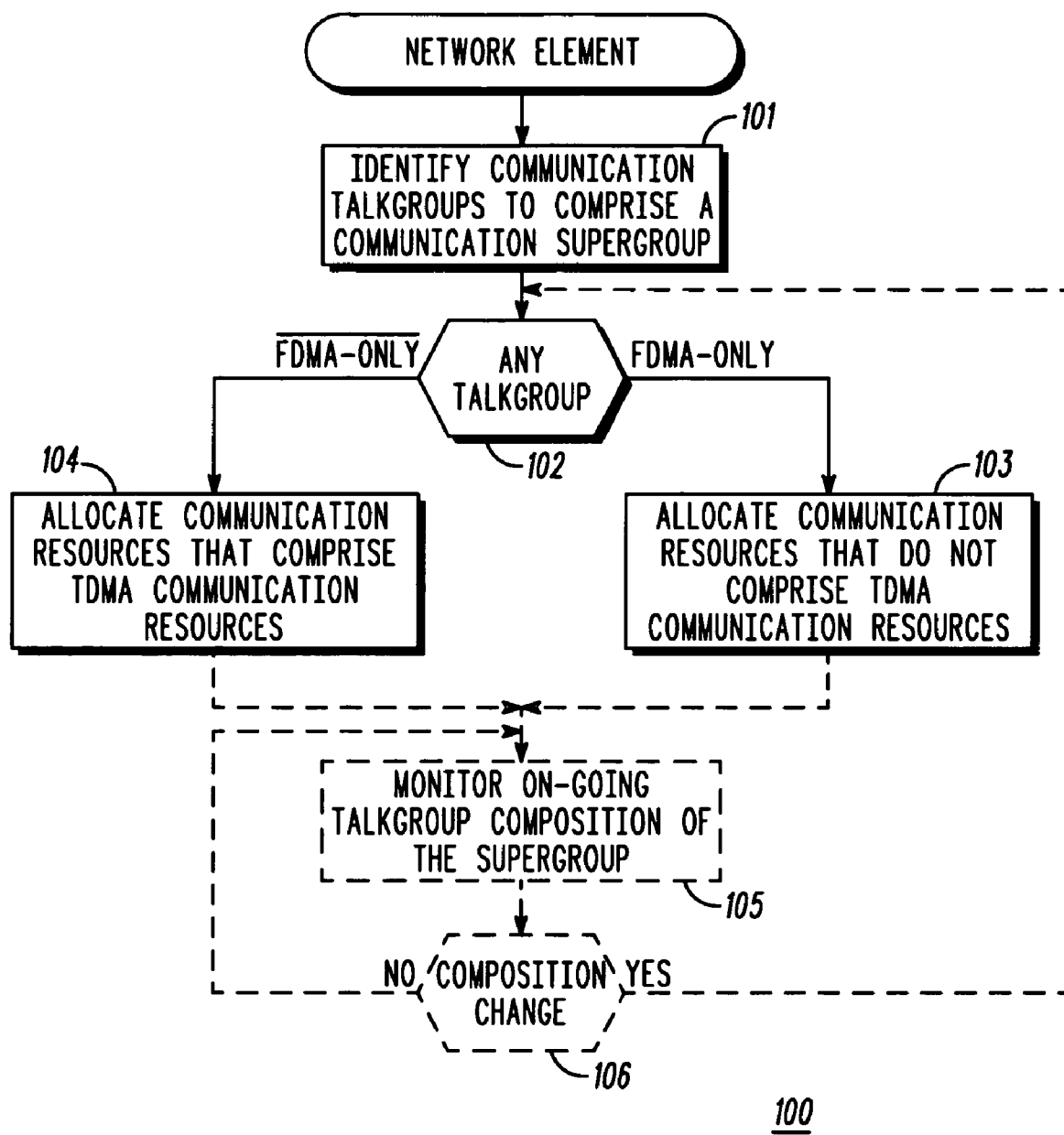
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a network element (such as, but not limited to, a communication network zone controller) can facilitate allocating first and second communication resources (such as, but not limited to, FDMA and TDMA communication resources) in support of supergroup communications. By one approach this comprises identifying communication talkgroups as are to comprise a part of the communication supergroup and then determining whether any of the communication talkgroups comprise first resource-only talkgroups. When any one of the communication talkgroups comprises a first resource-only talkgroup, the network element allocates communication resources to support the communication supergroup wherein the communication resources do not comprise second resource communication resources (for example, the network element allocates first resource communication resources). On the other hand, when none of the communication talkgroups comprises a first resource-only talkgroup, the network element allocates communication resources to support the communication supergroup wherein the communication resources comprise second resource communication resources.

So configured, and presuming for the sake of example that the first communication resource comprises FDMA-only communication resources and that the second communication resource comprises FDMA/TDMA communication resources, FDMA-only communication resources will be allocated when any talkgroup as comprises a part of the supergroup comprises an FDMA-only entity. This can be achieved by allocating the first communication resource (which already comprises an FDMA-only communication resource) or by allocating only the FDMA capability of the second communication resource. Conversely, when none of the supergroup talkgroups comprise FDMA-only entities, TDMA communication resources are allocated. As a result, and again for the sake of illustration and not for the purposes of limitation, this can comprise allocating full-rate vocoding usage when any supergroup talkgroup comprises an FDMA-only entity where full-rate vocoding comprises an FDMA-only communication resource.

There are various ways to determine whether any supergroup talkgroups comprise first resource-only entities. By one approach a count can be incremented for each first resource-only talkgroup that comprises a part of, or later joins, a given supergroup. Using this approach, that communication supergroup can be treated as having at least one first resource-only talkgroup whenever that count has at least a predetermined value. By one approach this same count can be decremented whenever a first resource-only talkgroup leaves a supergroup. In turn, whenever such decrementing results in a count that is less than the above-mentioned predetermined value, the communication resources can be re-allocated to support that supergroup with second resource communication resources.

These and other benefits may become clearer upon making a thorough review and study of the following detailed description. Referring now to the drawings, and in particular to FIG. 1, a corresponding process 100 provides for a network element (such as, but not limited to, a communication network zone controller as is known in the art) identifying 101 communication talkgroups as are to comprise a part of a given communication supergroup. This network element then determines 102 whether any of these communication talkgroups comprise, for example, FDMA-only talkgroups.

Figure 2:
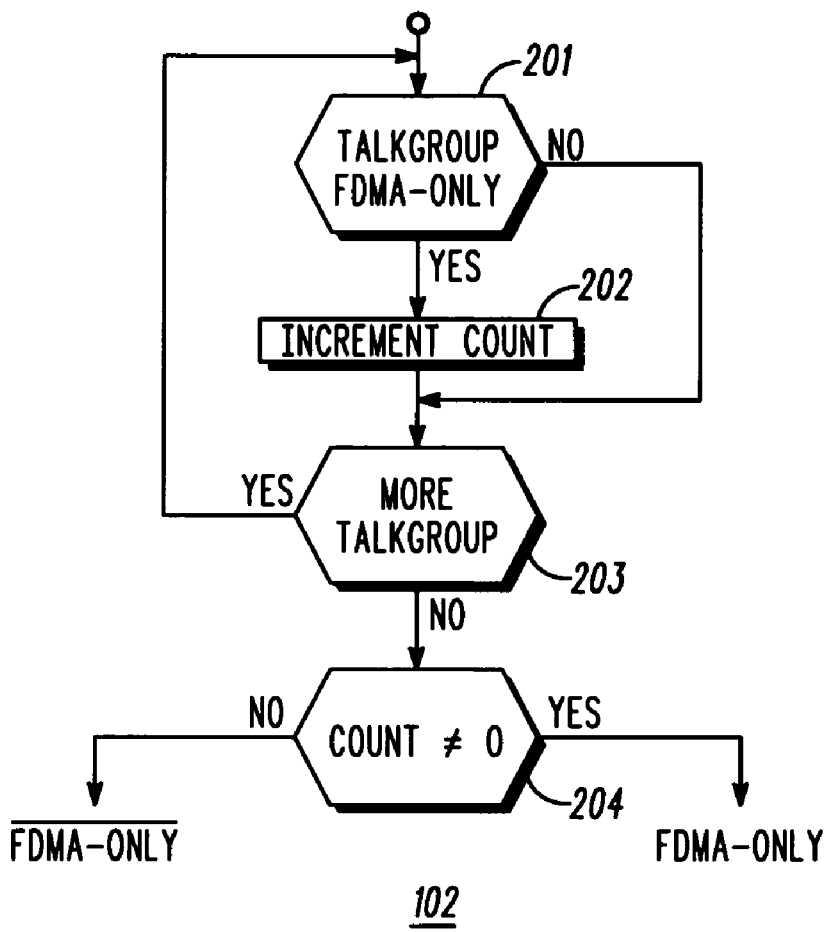
FIG. 2 comprises a flow diagram as configured in accordance with various embodiments of the invention.

There are various ways to effect such a determination 102. By one approach, and referring momentarily to FIG. 2, this determination 102 can comprise determining 201, for each talkgroup that is to comprise a part of the supergroup, whether that talkgroup comprises an FDMA-only entity. When false, this process 102 can then determine 203 whether there are any additional talkgroups to assess in this regard, and, when true, repeat the above-described determination 201 regarding FDMA requirements for each remaining talkgroup.

When the above determination 201 regarding FDMA requirements identifies that a given talkgroup is, indeed, an FDMA-only entity, this process 102 increments 202 a count. By one approach this count begins at zero and increases by integer increments with each detected FDMA-only talkgroup. (Those skilled in the art will understand and appreciate that such incrementing can begin as essentially any value and the incrementing intervals can be any interval width or value of choice. It will also be understood that "incrementing" readily encompasses increasing a given count value in either a positive or negative direction; for example, a count of "2" can be incremented by summing the count with +1 (thereby resulting in a count value of "3") or can be incremented by summing the count with −1 (thereby resulting in a count value of "1").)

Upon completing these steps for all members of candidate talkgroups, this process 102 can then determine 204 whether the resultant count has at least a predetermined value. This can comprise determining, for example, whether the count is "1" or greater, whether the count is other than zero, and so forth depending upon the particular approach taken in a given application setting. When the count meets this test, at least one of the supergroup talkgroups comprises an FDMA-only talkgroup. Conversely, when the count is otherwise, this process 102 identifies that none of the supergroup talkgroups comprise FDMA-only talkgroups.

Returning again to FIG. 1, when this determination 102 determines that at least one of the supergroup talkgroups comprises an FDMA-only talkgroup, this process 100 then allocates 103 communication resources to support the communication supergroup wherein the communication resources do not comprise TDMA communication resources (for example, the allocated resources can comprise FDMA-only communication resources). Those skilled in the art will recognize and understand that this encompasses, for example, allocation of an FDMA-only resource (such as a base station that can only operate in accordance with FDMA technique and technology) or allocation of a more agile platform (such as a base station that is capable of operating as either an FDMA platform or as a TDMA platform) that is restricted to operating in an FDMA-only mode of operation such that the TDMA capability is not allocated in the sense of being actively used during the supergroup communication.

When this determination 102 determines instead that none of the supergroup talkgroups comprises an FDMA-only talkgroup, this process 100 then allocates 104 communication resources to support the communication supergroup wherein the communication resources comprise TDMA communication resources. As noted earlier, in some systems full-rate vocoders may require utilization of an FDMA communication resource while half-rate vocoders may require utilization of a TDMA communication resource. The actions described above, therefore, can directly impact the use of facilitating technologies such as vocoder selection.

These described steps can serve, for example, to facilitate an initial allocation of communication resources with respect to a given supergroup upon the formulation of that supergroup. This process 100 can further serve, if desired, to optionally monitor 105 the on-going communication talkgroup composition of the communication supergroup. This process 100 can then provide for determining 106 whether and when the communication talkgroup composition of the communication supergroup changes. Such a change can occur, for example, when a talkgroup as comprises a part of the supergroup disengages or is otherwise removed from the talkgroup. As another example, such a change can occur when another talkgroup becomes newly added to the already-supported supergroup.

When this process 100 detects such a change, this process 100 can then provide for again determining 102 whether the change results in altering the status of the supergroup constituency with respect to FDMA-only talkgroup status. When, for example, a supergroup that previously had not included any FDMA-only talkgroups now includes such a talkgroup, this process 100 can readily provide for a re-allocation of communication resources. In particular, this supergroup can now be treated as having at least one FDMA-only talkgroup and communication resources that do not comprise TDMA communication resources can be accordingly allocated 103.

The previously described count mechanism can be employed, if desired, to facilitate the above-described steps. For example, an existing count can be further incremented or decremented as appropriate to reflect the joining and leaving of talkgroups over time. The newly resultant count can then be used to inform these actions as described above. For example, when the newly resultant count is at least a predetermined value as described above, this re-allocation can comprise allocating FDMA-only communication resources.

Figure 3:
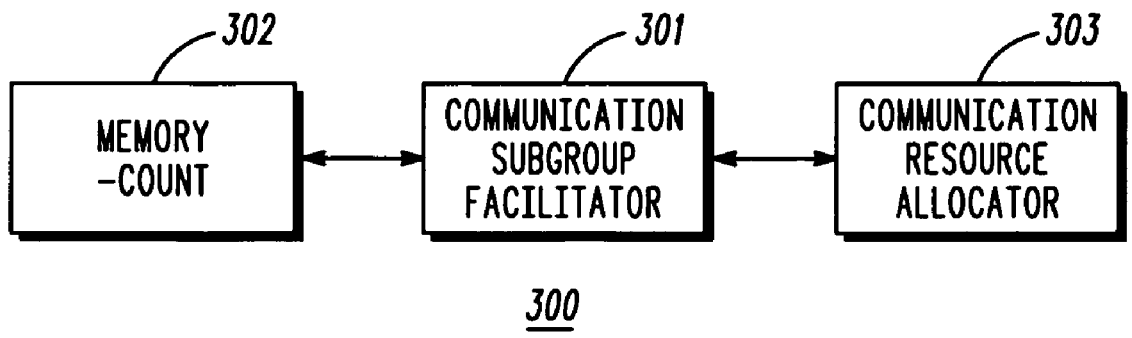
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example the apparatus 300 may comprise, for example, a network entity such as a communication system zone controller. In this illustrative embodiment the apparatus 300 comprises a communication supergroup facilitator 301 that operably couples to a memory 302 and a communication resource allocator 303. The memory 302 serves, at least in part, to store the aforementioned count. The communication resource allocator 303 is configured and arranged in this example to allocate either of a first communication resource (such as an FDMA communication resource that lacks TDMA capability and that employs, for example, a full rate vocoder) and a second communication resource (such as a TDMA communication resource that employs, for example, a half-rate vocoder), wherein the first and second communication resources are different from one another.

By one approach the communication supergroup facilitator 301 is configured and arranged to facilitate and carry out the processes described herein. This can comprise, for example, identifying communication talkgroups as are to comprise a part of a communication supergroup, determining whether any of the communication talkgroups comprise a first communication resource-only talkgroup, and incrementing a count for each first communication resource-only talkgroup that is to comprise a part of the communication supergroup. The communication supergroup facilitator 301 can then treat the communication supergroup as having at least one first communication resource-only talkgroup whenever this count has at least a predetermined value. This, in turn, can be used to inform the communication resource allocation process as described herein.

Those skilled in the art will recognize and understand that such an apparatus 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize and appreciate that these teachings permit both FDMA and TDMA talkgroups to participate in a same supergroup call while nevertheless facilitating an efficient and planned use of system resources. These teachings will further ensure that all end users as are affiliated with such a supergroup are able to decode the audio for the supergroup call. The count mechanism described herein is particularly helpful with respect to reducing required processing time when tracking the talkgroup constituency of a given supergroup over time.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate allocating frequency division multiple access (FDMA) and time division multiple access (TDMA) communication resources to support a communication supergroup comprising:
  at a network element:
    identifying communication talkgroups as are to comprise a part of the communication supergroup;
      determining whether any of the communication talkgroups comprise an FDMA-only talkgroup;
      when any one of the communication talkgroups comprises an FDMA-only talkgroup, allocating communication resources to support the communication supergroup wherein the communication resources do not comprise TDMA communication resources;
      when none of the communication talkgroups comprise an FDMA-only talkgroup, allocating communication resources to support the communication supergroup wherein the communication resources comprise TDMA communication resources.

2. The method of claim 1 wherein the FDMA-only communication resources employ a full rate vocoder and the TDMA communication resources employ a half rate vocoder.

3. The method of claim 1 wherein the network element comprises a communication network zone controller.

4. The method of claim 1 further comprising:
  monitoring an on-going communication talkgroup composition of the communication supergroup;
  when the communication talkgroup composition of the communication supergroup changes such that none of the communication talkgroups comprising the communication supergroup comprise an FDMA-only communication talkgroup, re-allocating communication resources to support the communication supergroup wherein the communication resources comprise TDMA communication resources.

5. The method of claim 1 further comprising:
  monitoring an on-going communication talkgroup composition of the communication supergroup;
  when the communication talkgroup composition of the communication supergroup changes such that at least one of the communication talkgroups comprising the communication supergroup comprises an FDMA-only communication talkgroup, re-allocating communication resources to support the communication supergroup wherein the communication resources comprise FDMA-only communication resources.

6. The method of claim 1 wherein determining whether any of the communication talkgroups comprise an FDMA-only communication talkgroup comprises:
  incrementing a count for each communication talkgroup comprising an FDMA-only talkgroup that is to comprise a part of the communication supergroup;
  treating the communication supergroup as having at least one FDMA-only talkgroup whenever the count has at least a predetermined value.

7. The method of claim 6 wherein incrementing a count comprises incrementing the count by one and wherein the predetermined value comprises a value of one.

8. The method of claim 6 further comprising:
  monitoring an on-going communication talkgroup composition of the communication supergroup;
  when the communication talkgroup composition of the communication supergroup changes such that an FDMA-only communication talkgroup leaves the communication supergroup, decrementing the count;
  whenever decrementing the count results in a count that is less than the predetermined value, re-allocating communication resources to support the communication supergroup wherein the communication resources comprise TDMA communication resources.

9. The method of claim 6 further comprising:
  monitoring an on-going communication talkgroup composition of the communication supergroup;
  when the communication talkgroup composition of the communication supergroup changes such that an FDMA-only communication talkgroup joins the communication supergroup, incrementing the count;
  whenever incrementing the count results in a count that is newly at least the predetermined value, re-allocating communication resources to support the communication supergroup wherein the communication resources comprise FDMA-only communication resources.

10. A method to facilitate allocating first and second communication resources to support a communication supergroup, wherein the first and second communication resources are different from one another, the method comprising:
at a network element:
identifying communication talkgroups as are to comprise a part of the communication supergroup;
determining whether any of the communication talkgroups comprise a first communication resource-only talkgroup;
incrementing a count for each first communication resource-only talkgroup that is to comprise a part of the communication supergroup;
treating the communication supergroup as having at least one first communication resource-only talkgroup whenever the count has at least a predetermined value and allocating first communication resources to support the communication supergroup.

11. The method of claim 10 wherein the first communication resources comprise frequency division multiple access communication resources and the second communication resources comprise time division multiple access communication resources.

12. The method of claim 10 wherein incrementing a count comprises incrementing the count by one and wherein the predetermined value comprises a value of one.

13. The method of claim 10 further comprising:
monitoring an on-going communication talkgroup composition of the communication supergroup;
when the communication talkgroup composition of the communication supergroup changes such that a first communication resource-only communication talkgroup leaves the communication supergroup, decrementing the count;
whenever decrementing the count results in a count that is less than the predetermined value, re-allocating communication resources to support the communication supergroup wherein the communication resources comprise the second communication resources.

14. The method of claim 10 further comprising:
monitoring an on-going communication talkgroup composition of the communication supergroup;
when the communication talkgroup composition of the communication supergroup changes such that a first communication resource-only communication talkgroup joins the communication supergroup, incrementing the count;
whenever incrementing the count results in a count that is newly at least the predetermined value, re-allocating communication resources to support the communication supergroup wherein the communication resources comprise only the first communication resources.

15. The method of claim 10 wherein the first communication resources employ a full rate vocoder and the second communication resources employ a half rate vocoder.

16. An apparatus comprising:
a communication resource allocator being configured and arranged to allocate either of a first communication resource and a second communication resource, wherein the first and second communication resources are different from one another;
a memory that stores a count;
a communication supergroup facilitator operably coupled to the communication resource allocator and the memory and being configured and arranged to:
identify communication talkgroups as are to comprise a part of a communication supergroup;
determine whether any of the communication talkgroups comprise a first communication resource-only talkgroup;
increment the count for each first communication resource-only talkgroup that is to comprise a part of the communication supergroup;
treat the communication supergroup as having at least one first communication resource-only talkgroup whenever the count has at least a predetermined value such that the communication resource allocator allocates first communication resources and not second communication resources to support the communication supergroup.

17. The apparatus of claim 16 wherein the apparatus comprises a communication system zone controller.

18. The apparatus of claim 16 wherein the first communication resource comprises a frequency division multiple access communication resource that lacks time division multiple access capability.

19. The apparatus of claim 18 wherein the second communication resource comprises a time division multiple access communication resource.

20. The apparatus of claim 16 wherein the first communication resource employs a full rate vocoder and the second communication resource employs a half rate vocoder.

* * * * *